(12) United States Patent
Sun

(10) Patent No.: US 12,253,201 B2
(45) Date of Patent: Mar. 18, 2025

(54) RISER ANCHOR AND INSTALLATION

(71) Applicant: Victaulic Company, Easton, PA (US)

(72) Inventor: Cong Sun, Bethlehem, PA (US)

(73) Assignee: VICTAULIC COMPANY, Easton, PA (US)

( * ) Notice: Subject to any disclaimer, the term of this patent is extended or adjusted under 35 U.S.C. 154(b) by 591 days.

(21) Appl. No.: 17/518,995

(22) Filed: Nov. 4, 2021

(65) Prior Publication Data

US 2022/0136622 A1    May 5, 2022

Related U.S. Application Data

(60) Provisional application No. 63/110,082, filed on Nov. 5, 2020.

(51) Int. Cl.
| | |
|---|---|
| *F16L 5/10* | (2006.01) |
| *E04B 5/48* | (2006.01) |
| *F16L 5/04* | (2006.01) |
| *F16L 5/08* | (2006.01) |

(52) U.S. Cl.
CPC .............. *F16L 5/10* (2013.01); *E04B 5/48* (2013.01); *F16L 5/04* (2013.01); *F16L 5/08* (2013.01)

(58) Field of Classification Search
CPC ....... F16L 5/10; F16L 5/04; F16L 5/08; E04B 5/48; E04B 1/948
See application file for complete search history.

(56) References Cited

U.S. PATENT DOCUMENTS

| | | | |
|---|---|---|---|
| 4,850,385 A * | 7/1989 | Harbeke | F16L 5/04 137/75 |
| 4,918,761 A | 4/1990 | Harbeke | |
| 4,976,457 A | 12/1990 | Carter | |
| 5,105,592 A * | 4/1992 | MacMillan | F16L 5/04 52/232 |
| 5,309,688 A | 5/1994 | Robertson | |
| 5,351,448 A * | 10/1994 | Gohlke | H02G 3/22 52/220.8 |
| 6,161,873 A * | 12/2000 | Munzenberger | F16L 5/04 285/3 |
| 6,305,133 B1 | 10/2001 | Cornwall | |
| 6,314,692 B1 | 11/2001 | Münzenberger | |
| 6,336,297 B1 | 1/2002 | Cornwall | |
| 6,643,985 B2 | 11/2003 | Münzenberger | |
| 8,001,737 B1 | 8/2011 | Price | |
| 8,393,121 B2 * | 3/2013 | Beele | A62C 2/065 52/220.8 |
| 9,220,932 B2 * | 12/2015 | Zernach | A62C 2/065 |
| 2006/0226649 A1 | 10/2006 | Heuer | |
| 2020/0031499 A1 | 1/2020 | Petit et al. | |

FOREIGN PATENT DOCUMENTS

KR    102023894 B1 *    4/2018

* cited by examiner

*Primary Examiner* — Babajide A Demuren
(74) *Attorney, Agent, or Firm* — Ballard Spahr LLP

(57) ABSTRACT

An anchor assembly for riser pipes uses a plate and sleeve to support a stub pipe which penetrates a floor of a structure, such as a building, in which the riser is located. Studs extending from the plate and the sleeve engage the floor and enhance the local structural strength of the floor. A bracket which engages the plate is used to mount the stub pipe within the sleeve. The riser pipe elements are attached to the ends of the stub pipe. Fire insulation material is positioned between the stub pipe and the sleeve.

27 Claims, 7 Drawing Sheets

RISER ANCHOR AND INSTALLATION

CROSS REFERENCE TO RELATED APPLICATIONS

This application is based upon and claims priority to U.S. Provisional Application No. 63/110,082, filed Nov. 5, 2020, which application is hereby incorporated by reference herein.

FIELD OF THE INVENTION

This invention concerns structural components for supporting pipe elements.

BACKGROUND

Vertical piping installations, commonly referred to as "risers", are essential to the distribution of water and other fluids throughout buildings and other structures. Riser support structures must meet many design requirements, in particular, structural demands such as thermal loads and thermal expansion, thrust loads, predicted regional seismic loads as well as the often considerable static loads imposed by the dead weight of the riser itself. Furthermore, the riser support structure must meet these design requirements without compromising the local structural integrity of the building in which the riser is installed. Traditional riser designs use clamps to secure the riser pipe at the floor level and brackets to secure it to an adjacent shear wall. However, these designs suffer various disadvantages as riser clamps which depend on friction become less effective with repeated thermal expansion cycles of the riser, and supporting shear walls are not always conveniently located with respect to the riser location. There is clearly an opportunity to improve riser support installation design.

SUMMARY

The invention concerns an anchor assembly for anchoring a riser pipe in a floor structure. In one example embodiment the anchor assembly comprises a plate having an upper face and a lower face oppositely disposed from one another. The plate defines an aperture therethrough. A sleeve is attached to the plate. The sleeve extends through the aperture and defines a bore oriented transversely to the plate. The sleeve has an upper sleeve portion having a sleeve top projecting outwardly from the upper face of the plate and a lower sleeve portion having a sleeve bottom projecting outwardly from the lower face of the plate. A plurality of collars pass through the plate. Each collar has internal screw threads. The plurality of collars each have an upper collar surface flush with the upper face of the plate and a lower collar surface that projects from the lower surface of the plate.

An example embodiment may further comprise a plurality of studs extending from the lower face of the plate. A plurality of shear keys may also be attached to the sleeve and project outwardly away from the bore. The shear keys are attached to the lower sleeve portion of the sleeve. In an example embodiment a stub pipe extends through the bore. A bracket is attached to the stub pipe. The bracket overlies the upper face of the plate. A plurality of threaded fasteners attach the bracket to the plate. Each fastener engages a respective collar of the plurality of collars. In another example the bracket comprises a plurality of arms projecting transversely to the stub pipe. The upper sleeve portion of the sleeve projects from the upper face of the plate in an example embodiment. The upper sleeve portion defines a plurality of notches therein. Each arm is received within a respective one of the notches. An example embodiment may further comprise a layer of fire insulation positioned between the stub pipe and the sleeve.

The invention also encompasses an installation for a riser pipe. In an example embodiment the installation comprises a poured floor having an upper surface and a lower surface oppositely disposed. An anchor assembly is embedded in the poured floor. In an example embodiment the anchor assembly comprises a plate having an upper face and a lower face oppositely disposed. The plate defines an aperture therethrough aligned with the opening. A sleeve is attached to the plate. The sleeve extends through the aperture and the opening and defines a bore oriented transversely to the plate and the floor. The sleeve includes an upper portion having a sleeve top projecting outwardly from the upper face of the plate. The sleeve further has a lower portion having a sleeve bottom projecting outwardly from the bottom face of the plate. A plurality of collars are attached and pass through the plate. Each collar has internal screw threads. Further by way of example, a plurality of studs extend from the lower face of the plate. The studs are embedded within the floor. Also by way of example, a plurality of shear keys are attached to lower sleeve portion and project outwardly away from the bore. The shear keys underlie the lower face of the plate and are embedded within the floor. Further by way of example each the plurality of collars may have an upper collar surface that is flush with the upper face of the plate and a lower collar surface that projects from the lower face of the plate.

An example installation according to the invention may further comprise a stub pipe extending through the bore. A bracket is attached to the stub pipe. The bracket overlies the upper face of the plate. A plurality of threaded fasteners attach the bracket to the plate. Each fastener engages a respective collar of the plurality of collars. In an example the bracket may comprise a plurality of arms projecting transversely to the stub pipe. The upper sleeve portion defines a plurality of notches therein. Each arm is received within a respective one of the notches. Further by way of example a layer of fire insulation may be positioned between the stub pipe and the sleeve. In an example embodiment the upper face of the plate is flush with the upper surface of the floor. In a particular embodiment the sleeve bottom is flush with the lower surface of the floor. The floor may comprise a concrete slab or a metal deck arranged beneath a concrete slab in an example embodiment.

DETAILED DESCRIPTION

Figure 1:
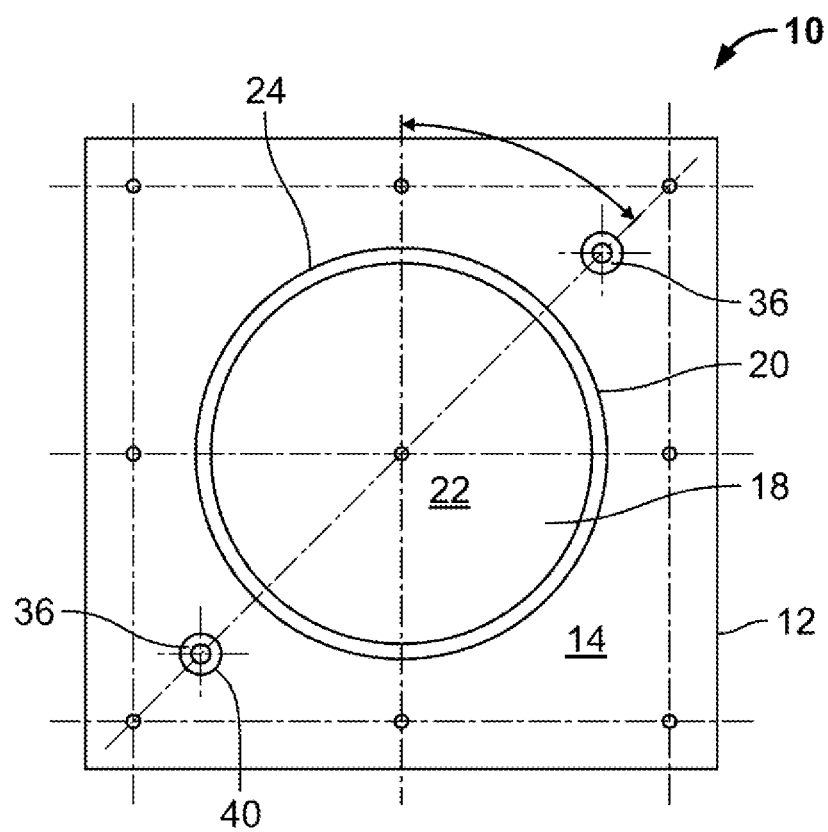
FIG. 1 is a plan view of an example anchor assembly according to the disclosure.
Figure 2:
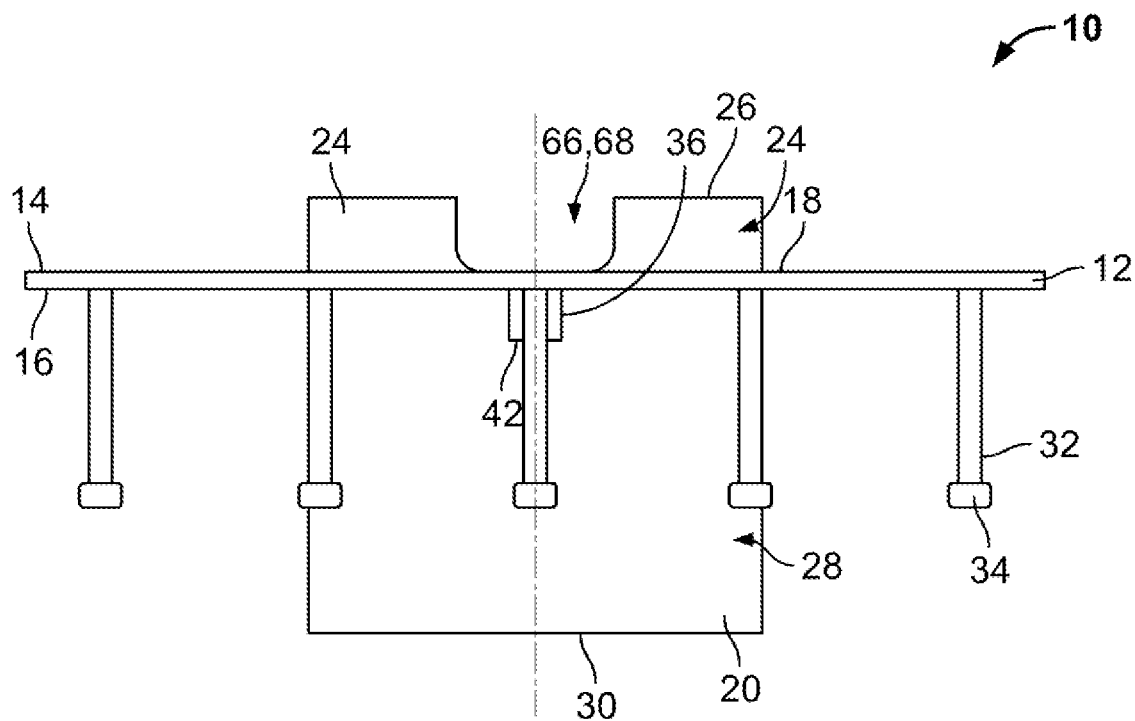
FIG. 2 is an elevational view of the anchor assembly shown in FIG. 1.
Figure 3:
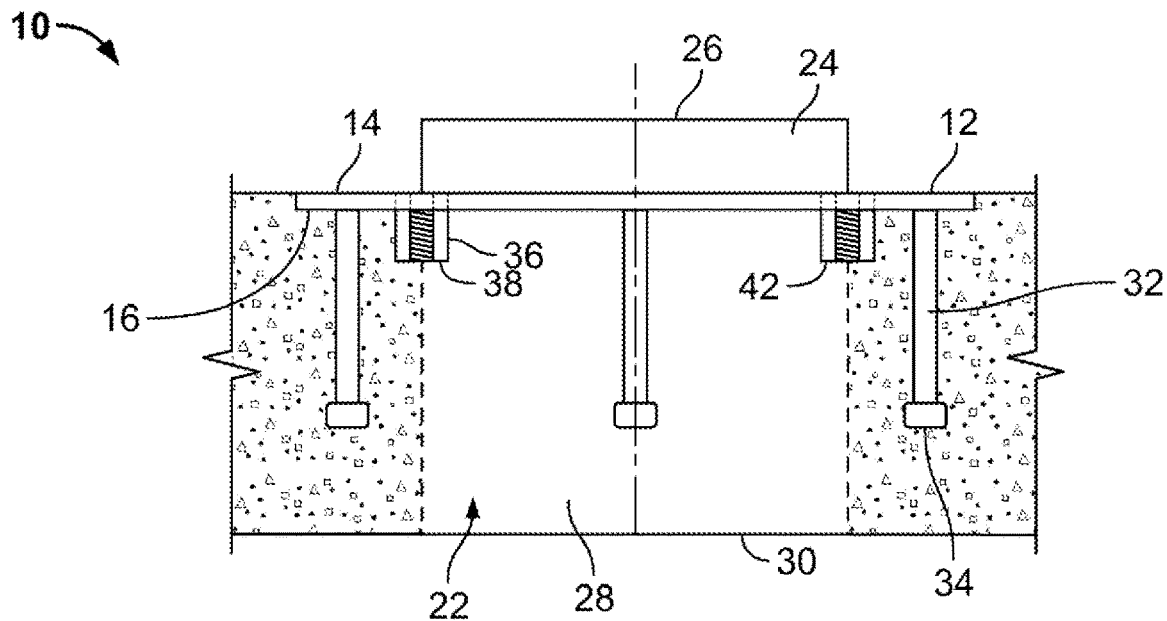
FIG. 3 is an elevational view of the anchor assembly shown in FIG. 1, the view being rotated 45 degrees relative to the view shown in FIG. 2.
Figure 10:
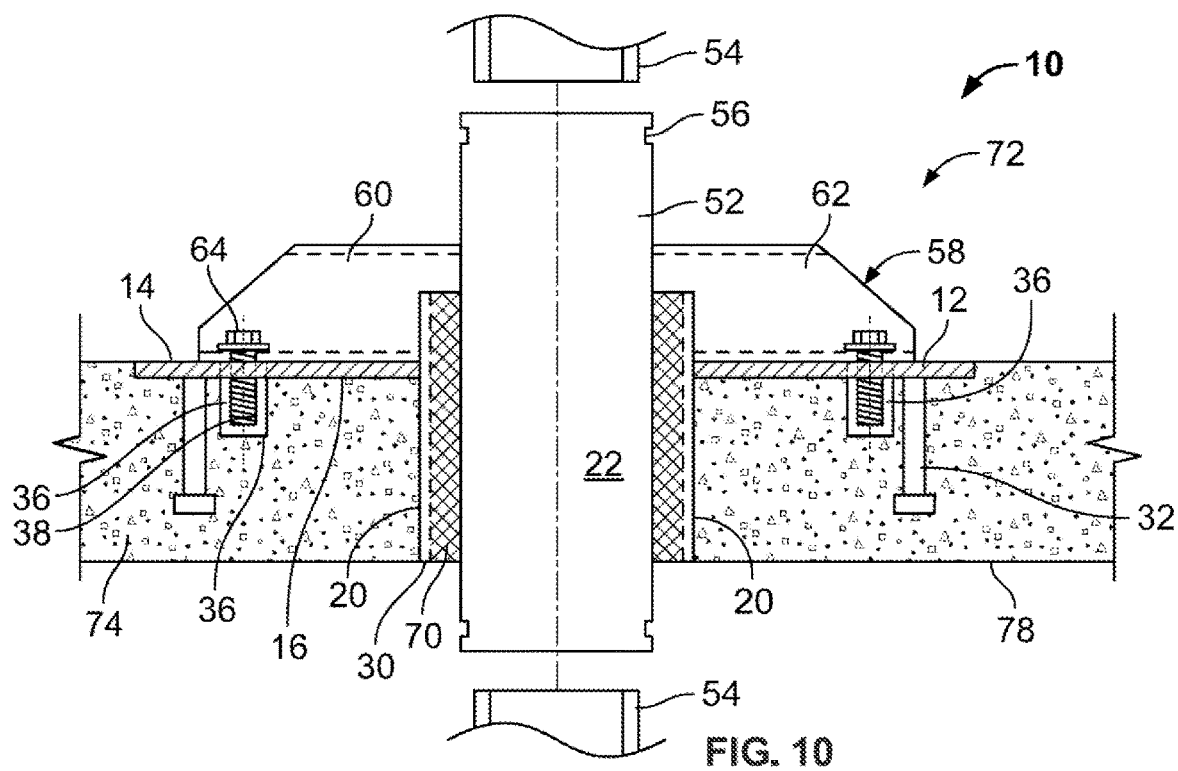
FIG. 10 is a longitudinal sectional views of one example installation according to the disclosure.
Figure 11:
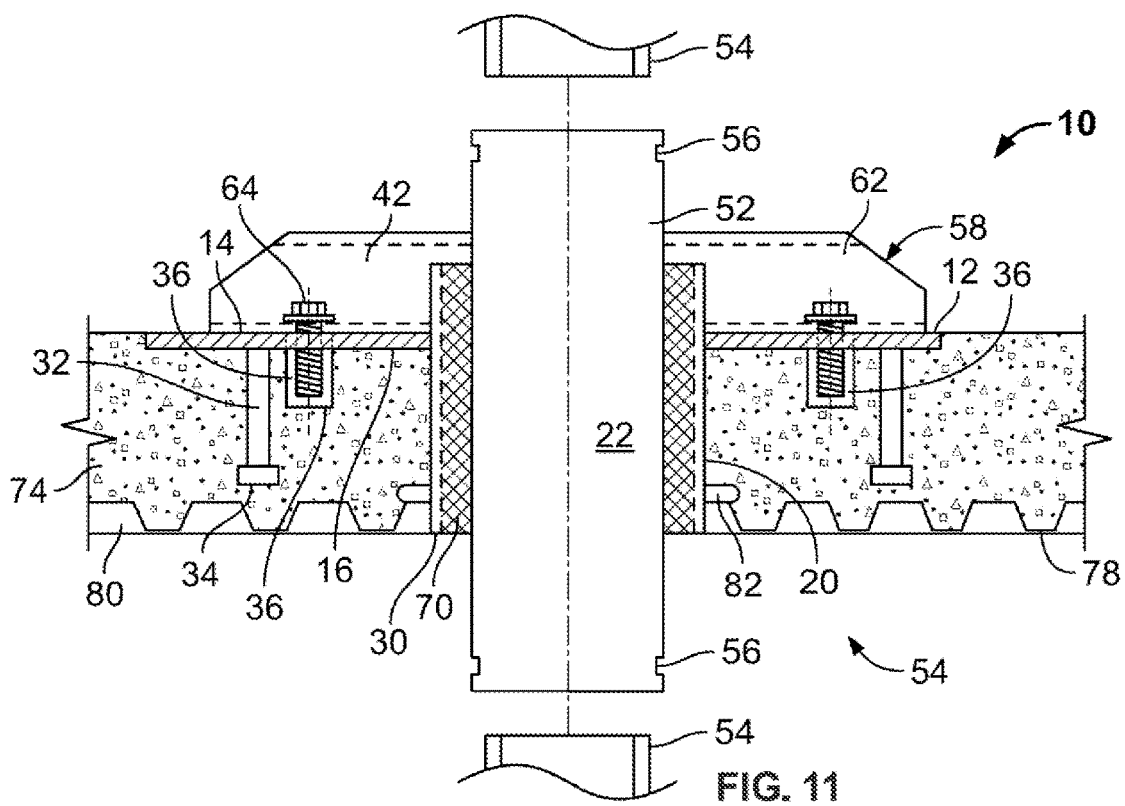
FIG. 11 is a longitudinal sectional view of another example installation according to the present disclosure.
Figure 12:
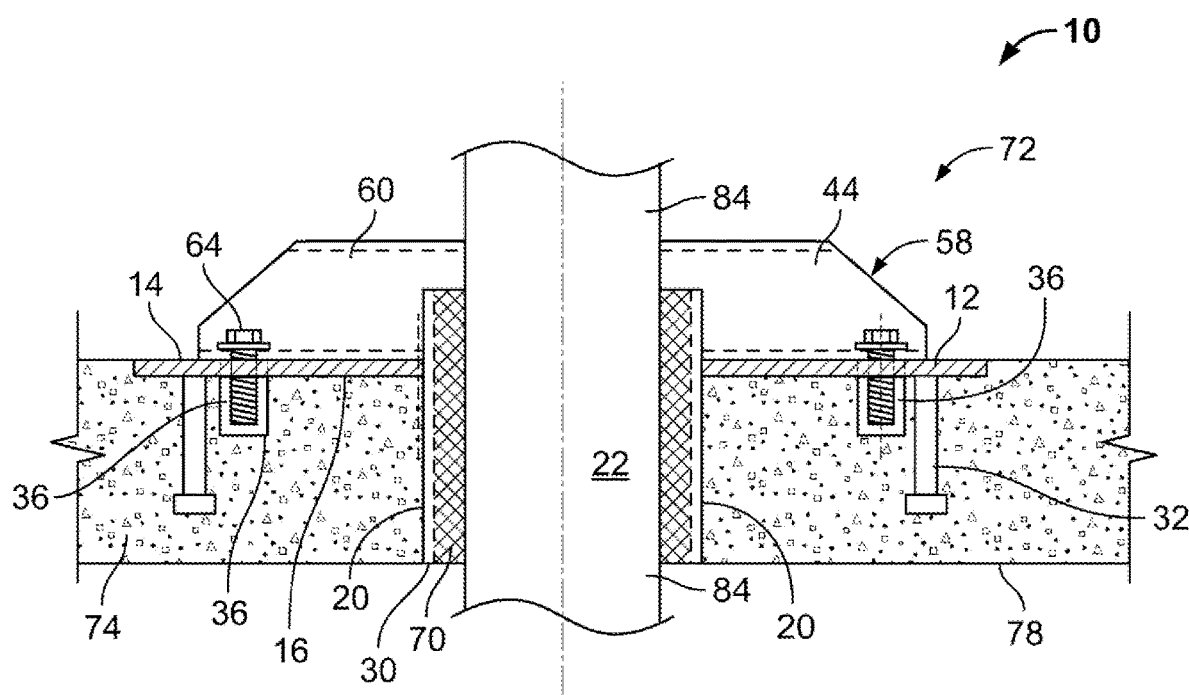
FIG. 12 is a longitudinal sectional view of another example installation according to the present disclosure.

FIGS. 1 through 3 show an example anchor assembly 10 for anchoring a riser pipe (see FIGS. 10 through 12) in a floor structure (see FIGS. 10 through 12). In this example, the anchor assembly 10 comprises a plate 12 having an upper face 14 and a lower face 16 oppositely disposed from one another, the plate 12 defining an aperture 18 extending there through. A sleeve 20 is attached to the plate 12. The sleeve extends through the aperture 18 and defines a bore 22 oriented transversely to the plate 12. The sleeve 20 includes an upper sleeve portion 24 having a sleeve top 26 projecting outward from the upper face 14 of the plate 12. The sleeve 20 further includes a lower sleeve portion 28 having a sleeve bottom 30 projecting outward from the lower face 16 of the plate 12. It is advantageous if the upper sleeve portion 24 of the sleeve 20 projects from the upper face 14 of the plate 12 to act as a water dam and prevent flooding between floors when the assembly 10 is installed.

Anchor assembly 10 may further comprise a plurality of studs 32 which extend from the lower face 16 of plate 12. In one example, the studs 32 are welded to the plate 12 and have enlarged heads 34. When the assembly 10 is installed in a poured floor such as concrete, studs 32 form a composite structure with the floor to provide fixity to maintain the orientation and location of the assembly during concrete pour and subsequent curing. Studs 32 also strengthen the concrete floor locally against punching shear failure and slab breakout failure. Studs 32 increase the area engagement between anchor assembly 10 and the floor (see FIGS. 10 through 12), which increases the loads which the assembly and the floor may sustain.

Figure 4:
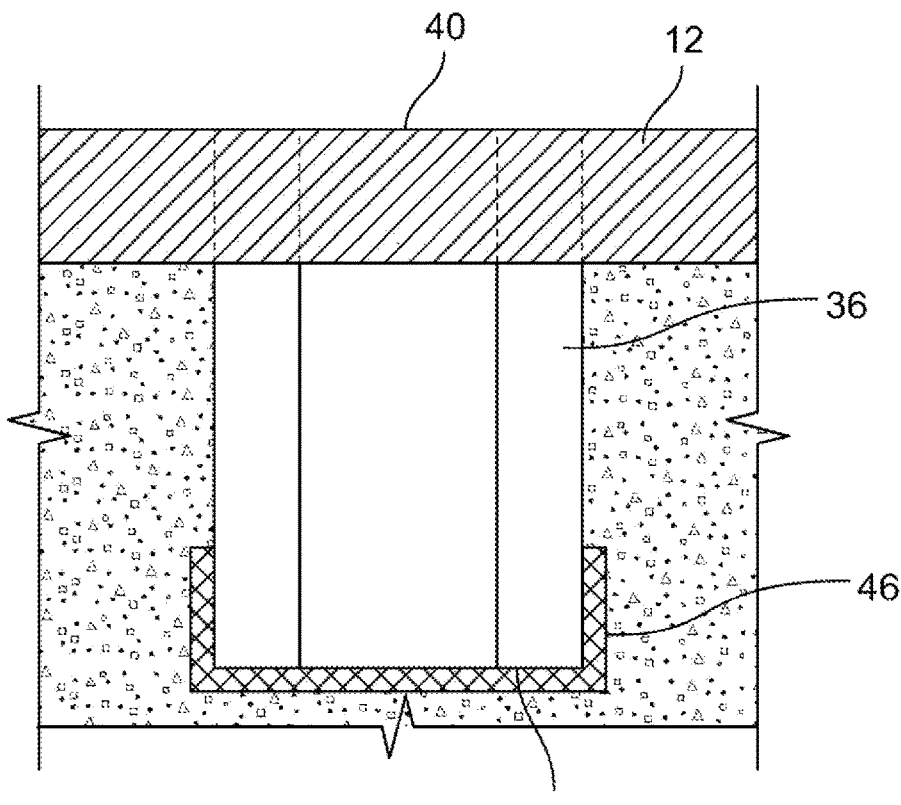
FIG. 4 is a detail of the example anchor assembly shown in FIG. 1 illustrating additional components according to the invention.
Figure 5:
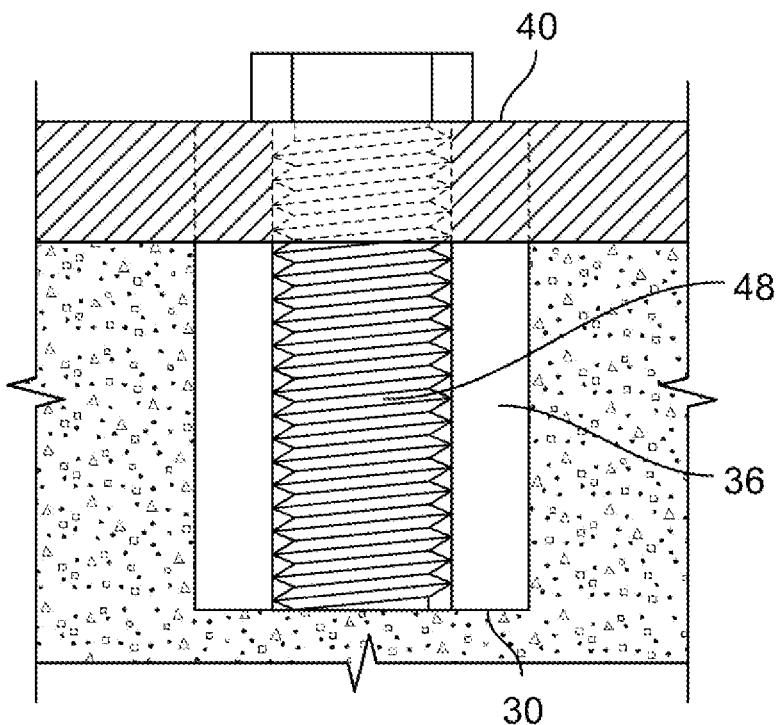
FIG. 5 is an alternate detail of the example anchor assembly shown in FIG. 1 illustrating additional components according to the invention.
Figure 6:
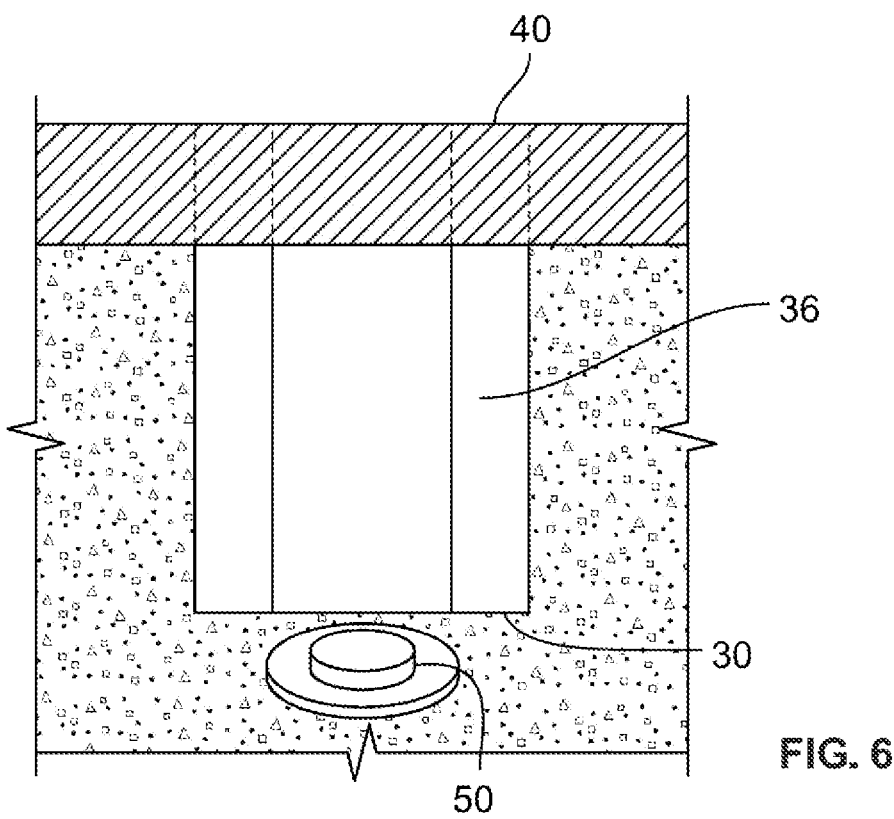
FIG. 6 is an alternate detail of the example anchor assembly shown in FIG. 1 illustrating additional components according to the invention.
Figure 7:
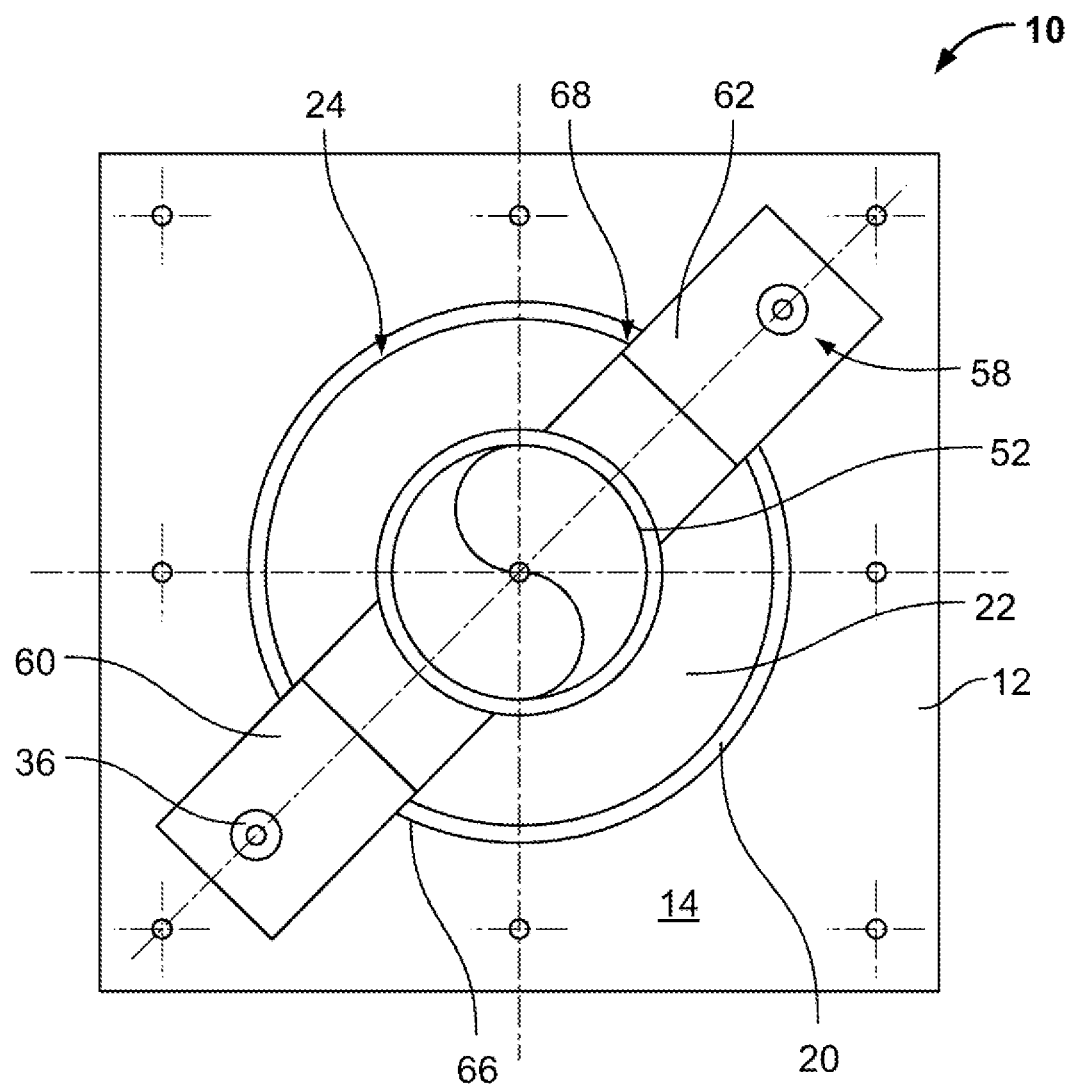
FIG. 7 is a plan view of the example anchor assembly shown in FIG. 1 illustrating additional components according to the invention.
Figure 8:
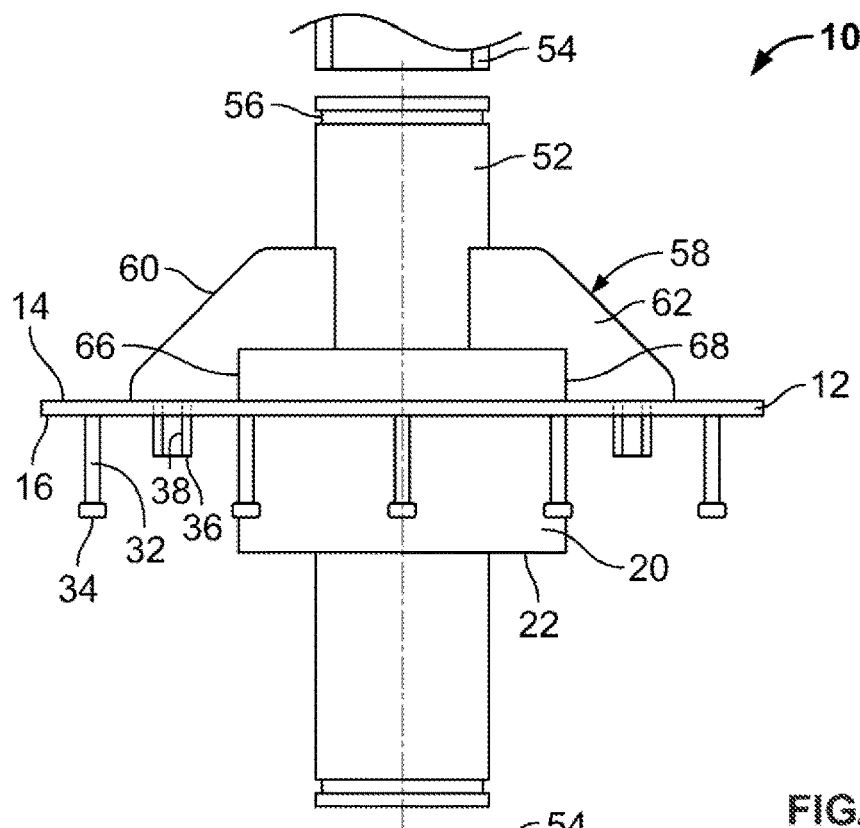
FIG. 8 is an elevational view of the anchor assembly shown in FIG. 4.
Figure 9:
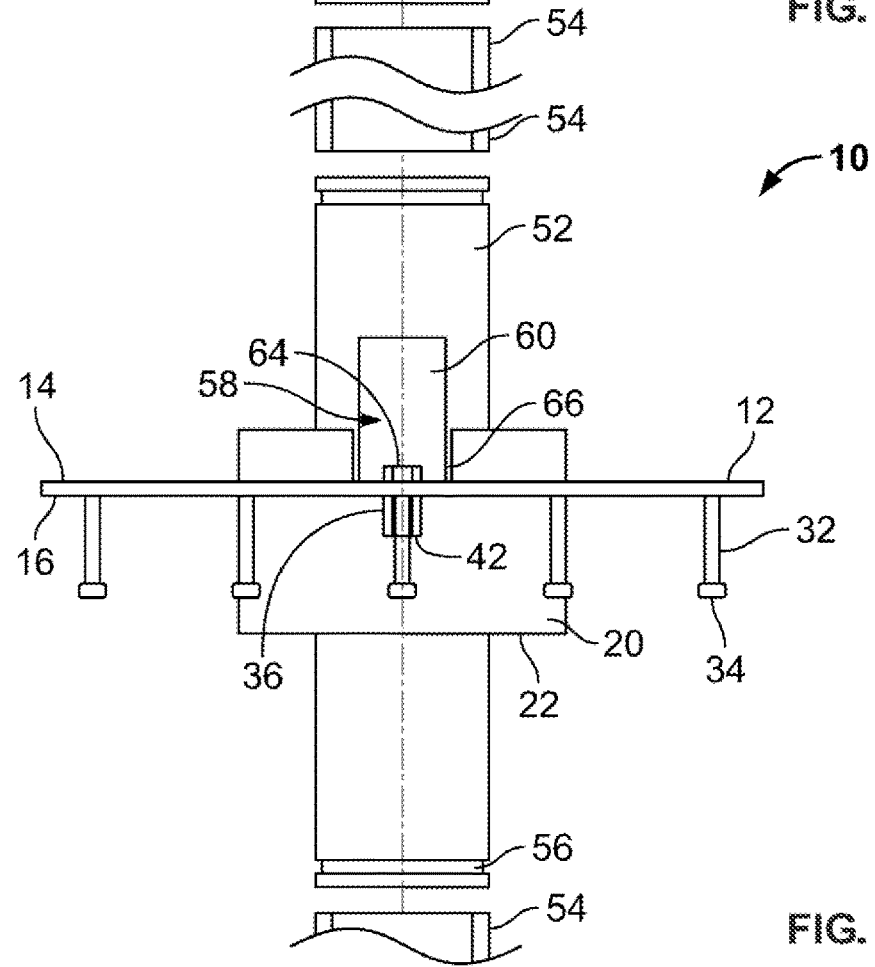
FIG. 9 is an elevational view of the anchor assembly shown in FIG. 4, the view being rotated 45 degrees relative to the view shown in FIG. 5.

With reference again to FIGS. 1 through 3, a plurality of collars 36 are attached to and extend through the plate 12. Each a collar 36 establishes an attachment point to plate 12 and has internal screw threads 38 for receiving a threaded fastener as explained below. Each of the plurality of collars 36 has an upper collar surface 40 and a lower collar surface 42. When the plurality of collars 36 are mounted to the plate 12, the upper collar surface 40 may be mounted flush to the upper face 14 of the plate 12, thereby preventing damage during and after construction. In one example, when the plurality of collars 36 are mounted to the plate 12, the lower collar surface 42 projects outwardly from the lower face 16. When positioned on the lower face 16 the collars 36 may be protected during concrete pour to prevent them from being clogged with concrete and ready to accept the fasteners 64. One example utilizes a plurality of pour blocking elements 44 to prevent intrusion of the poured floor (such as concrete) from clogging the collars 36. FIG. 4 illustrates one example of a pour blocking element 44 wherein it comprises a silicon cover 46. FIG. 5 illustrates another example wherein the pour blocking element 44 comprises a temporary plastic fastener 48 that can be removed once the poured floor solidifies. FIG. 6 illustrates still another example wherein the pour blocking element 44 comprises a plastic plug 50. It should be understood, however, that a variety of pour blocking elements 44 are contemplated by the present disclosure.

FIGS. 10 and 11 illustrate further aspects of the anchor assembly 10 comprising a stub pipe 52 which extends through the bore 22 of sleeve 20. The stub pipe 52 permits the attachment of riser pipe elements 54 to the anchor assembly 10 and thus may have one or more circumferential grooves 56 positioned in an outer surface thereof. Grooves 56 are present when mechanical couplings are used to join the riser pipe elements 54 to the stub pipe 52 and are therefore positioned proximate to the ends of the stub pipe 52. A bracket 58 is affixed to the stub pipe 52 and attaches the stub pipe 52 to the plate 12. The bracket 58 may comprise a plurality of arms, in one example, first and second arms 60 and 62 attached and projecting transversely to the stub pipe 52. The bracket 58 overlies the upper face 14 of plate 12 and is attached to the plate via a plurality of threaded fasteners 64. Each fastener engages a respective collar 36. It is advantageous to have the bracket 58 directly contact the plate 12 so as to distribute downward forces over as great an area as possible. Therefore, the upper sleeve portion 24 of the sleeve 20 is provided with a plurality of notches, in this example, first and second notches 66 and 68. The first and second arms 60 and 62 are received within the first and second notches 66 and 68 allowing direct contact between the arms and the plate. In one example, the plurality of collars 36 are positioned on the plate 12 in alignment with the plurality of notches 66,68. It is of course understood that bracket 58 may comprise additional arms 60,62 and that additional collars 36 may also be provided depending upon the dictates of a particular design. As shown in FIGS. 10 and 11, a layer of fire insulation 70 is positioned between the stub pipe 52 and the sleeve 20. The various components of the anchor assembly (excluding the fire insulation) may be formed of steel, and attachment of the various components via weldments is considered practical.

As further shown in FIGS. 10 and 11, the disclosure also encompasses an installation 72. Example installation 72 comprises an anchor assembly 10 installed in a poured floor 74, preferably concrete. It is advantageous if the upper face 14 of the plate 12 is installed flush with the upper floor surface 76 of the poured concrete floor 74. Additionally, the sleeve bottom 30 of the sleeve 20 may be positioned flush with the lower floor surface 78 of the poured concrete floor 74. This flush sleeve 20 arrangement helps to ensure that the anchor assembly 10 can be supported on any concrete form work during the concrete pour. FIGS. 10 and 11 illustrate two example installation 72 embodiments. FIG. 10 shows an example wherein studs 32 reinforce a poured concrete floor 74. FIG. 11 shows an installation example comprising a composite metal deck 80 and poured concrete floor 74. Further engagement between the anchor assembly 10 and the floor structure may be provided by a plurality of shear keys 82 attached to the lower sleeve portion 28 of the sleeve 20. Shear keys 82 project outwardly away from the bore 22 of sleeve 20 and engage the metal deck 80. Shear keys 82 help properly position the sleeve 20 in the metal deck 80 during assembly and also help maintain sleeve 20 position during concrete pour. Shear keys 82 may take the form of discrete tabs welded to the lower sleeve portion 28 of the sleeve 20.

In another example illustrated in FIG. 12, the bracket 58 is attached directly to the riser pipe 84. In this example installation 72 the anchor assembly 10 is again installed in a poured floor 74, preferably concrete. The upper face 14 of the plate 12 is installed flush with the upper floor surface 76 of the poured concrete floor 74. Additionally, the sleeve bottom 30 of the sleeve 20 may be positioned flush with the lower floor surface 78 of the poured concrete floor 74. The bracket 58 is affixed directly to the riser pipe 84 and attaches the riser pipe 84 to the plate 12. The bracket 58 again may comprise a plurality of arms, in this example, first and second arms 60 and 62 attached and projecting transversely to the riser pipe 84. The bracket 58 overlies the upper face 14 of plate 12 and is attached to the plate 12 via a plurality of threaded fasteners 64 which engage the plurality of collars 36 in the fashion previously described.

Anchor assemblies 10 according to the present disclosure are expected to support riser pipes directly at the slab penetration point and thus provide a design which enhances the local load carrying capacity of both concrete floors as well as concrete composite metal decks. Assemblies 10 are expected to significantly reduce the total number of fixed supports required as compared with traditional riser systems and thereby reduce the number of "thermal lock points" to allow the riser to accommodate greater thermal expansion and contraction with lower stresses on the fixed supports.

The present disclosure can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

What is claimed is:

1. An anchor assembly for anchoring a riser pipe in a floor structure, said anchor assembly comprising:
    a plate having an upper face and a lower face oppositely disposed from one another, said plate defining an aperture therethrough;
    a sleeve attached to said plate, said sleeve extending through said aperture and defining a bore oriented transversely to said plate, said sleeve including an upper sleeve portion having a sleeve top projecting outwardly from said upper face and a lower sleeve portion having a sleeve bottom projecting outwardly from said lower face;
    a plurality of collars extending through said plate, each said collar having internal screw threads; and
    a plurality of studs extending from said lower face of said plate.

2. The anchor assembly according to claim 1, wherein each of said plurality of collars has an upper collar surface that is flush with said upper face and a lower collar surface that projects from said lower face.

3. The anchor assembly according to claim 1, wherein each of said plurality of studs includes an enlarged head.

4. The anchor assembly according to claim 1, further comprising a plurality of shear keys attached to said lower sleeve portion and projecting outwardly away from said bore.

5. The anchor assembly according to claim 1, further comprising:
    a stub pipe extending through said bore;
    a bracket attached to said stub pipe, said bracket overlying said upper face of said plate; and
    a plurality of threaded fasteners attaching said bracket to said plate, each of said threaded fastener engaging a respective collar of said plurality of collars.

6. The anchor assembly according to claim 5, further comprising a layer of fire insulation positioned between said stub pipe and said sleeve.

7. The anchor assembly according to claim 5, wherein upper sleeve portion comprises a plurality of notches formed therein; and
    wherein said plurality of collars are positioned on said plate in alignment with said plurality of notches.

8. The anchor assembly according to claim 7, wherein said bracket comprises a plurality of arms projecting transversely to said stub pipe, each said plurality of arms being received within a respective one of said notches.

9. An installation for a riser pipe, said installation comprising:
    a poured floor having an upper floor surface and a lower floor surface oppositely disposed;
    an anchor assembly embedded in said floor, comprising:
    a plate having an upper face and a lower face oppositely disposed, said plate defining an aperture therethrough;
    a sleeve attached to said plate, said sleeve extending through said aperture and defining a bore oriented transversely to said plate, said sleeve including an upper sleeve portion having a sleeve top projecting outwardly from said upper face and a lower sleeve portion having a sleeve bottom projecting outwardly from said lower face;
    a plurality of collars extending through said plate, each said collar having internal screw threads; and
    a plurality of studs extending from said lower face of said plate, said studs being embedded within said floor, each of said plurality of studs including an enlarged head.

10. The installation according to claim 9, wherein each of said plurality of collars has an upper collar surface that is flush with said upper face and a lower collar surface that projects from said lower face.

11. The installation according to claim 9, further comprising:
    a plurality of shear keys attached to said lower sleeve portion and projecting outwardly away from said bore, said shear keys being embedded within said floor.

12. The installation according to claim 9, wherein said upper face of said plate is flush with said upper floor surface.

13. The installation according to claim 9, further comprising:
    a plurality of notches formed in said upper sleeve portion.

14. The installation according to claim 13, further comprising:
    a stub pipe extending through said bore;
    a bracket attached to said stub pipe, said bracket overlying said upper face of said plate, said bracket comprising a plurality of arms projecting transversely to said stub pipe; and
    a plurality of threaded fasteners attaching said plurality of arms to said plate, each of said threaded fasteners engaging a respective collar of one of said plurality of collars.

15. The installation according to claim 14, further comprising a layer of fire insulation positioned between said stub pipe and said sleeve.

16. The installation according to claim 9, further comprising:
a plurality of pour blocking elements, each of said plurality of pour blocking elements attached to said lower collar surface of one of said plurality of collars.

17. The installation according to claim 16, wherein said plurality of pour blocking elements comprise a plurality of silicon covers.

18. The installation according to claim 16, wherein said plurality of pour blocking elements comprise a plurality of temporary plastic fasteners.

19. The installation according to claim 16, wherein said plurality of pour blocking elements comprise a plurality of plastic caps.

20. An installation for a riser pipe, said installation comprising:
a poured floor having an upper floor surface and a lower floor surface oppositely disposed;
an anchor assembly embedded in said floor for anchoring said riser pipe in said floor, said anchor assembly comprising:
a plate having an upper face and a lower face oppositely disposed, said plate defining an aperture therethrough;
a sleeve attached to said plate, said sleeve extending through said aperture and defining a bore oriented transversely to said plate, said sleeve including an upper sleeve portion having a sleeve top projecting outwardly from said upper face and a lower sleeve portion having a sleeve bottom projecting outwardly from said lower face;
a plurality of collars extending through said plate, each said collar having internal screw threads, each of said plurality of collars having an upper collar surface flush with said upper face and a lower collar surface projecting from said lower face; and
a plurality of notches formed in said upper sleeve portion;
a bracket overlying said upper face of said plate, said bracket comprising a plurality of arms projecting transversely to said riser pipe; and
a plurality of threaded fasteners attaching said plurality of arms to said plate, each of said threaded fasteners engaging a respective collar of one of said plurality of collars.

21. The installation according to claim 19, wherein said upper face is flush with said upper floor surface and said sleeve bottom is flush with said lower floor surface.

22. The installation according to claim 20, wherein said bracket is attached to said riser pipe.

23. The installation according to claim 22 further comprising:
a layer of fire insulation positioned between said riser pipe and said sleeve.

24. The installation according to claim 20, further comprising:
a stub pipe extending through said bore;
wherein said bracket is attached to said stub pipe.

25. The installation according to claim 24, further comprising a layer of fire insulation positioned between said stub pipe and said sleeve.

26. The installation according to claim 20, wherein said poured floor comprises a concrete floor.

27. The installation according to claim 20, wherein said poured floor comprises a concrete floor poured over metal deck.

* * * * *